United States Patent [19]

Roberts

[11] Patent Number: 4,829,578
[45] Date of Patent: May 9, 1989

[54] SPEECH DETECTION AND RECOGNITION APPARATUS FOR USE WITH BACKGROUND NOISE OF VARYING LEVELS

[75] Inventor: Jed M. Roberts, Cambridge, Mass.
[73] Assignee: Dragon Systems, Inc., Newton, Mass.
[21] Appl. No.: 914,667
[22] Filed: Oct. 2, 1986
[51] Int. Cl.[4] .............................................. G10L 3/00
[52] U.S. Cl. .................................... 381/46; 364/513.5
[58] Field of Search ............................ 381/43, 46, 47; 364/513.5

[56] References Cited

U.S. PATENT DOCUMENTS

| | | | |
|---|---|---|---|
| 4,239,936 | 12/1980 | Sakoe | 381/43 X |
| 4,277,645 | 7/1981 | May, Jr. | 381/46 |
| 4,351,983 | 9/1982 | Crouse et al. | 381/46 |
| 4,357,491 | 11/1982 | Daaboul et al. | 381/46 |
| 4,365,112 | 12/1982 | Rueffer et al. | 381/46 |
| 4,401,849 | 8/1983 | Ichikawa et al. | 381/46 |
| 4,481,593 | 11/1984 | Bahler | 364/513.5 |
| 4,696,040 | 9/1987 | Doddington et al. | 381/46 |
| 4,696,041 | 9/1987 | Sakata | 381/46 |

Primary Examiner—Patrick R. Salce
Assistant Examiner—Marc S. Hoff
Attorney, Agent, or Firm—Edward W. Porter

[57] ABSTRACT

A speech detection system compares the amplitude of an audio signal during successive time periods with speech detection thresholds, and generates an indication of whether the signal contains speech. It derives a background amplitude level from portions of the signal which it indicates do not contain speech, and improves its speech detection by altering the amplitude of the audio signal relative to the speech detection thresholds as a function of this background level. Preferably the background amplitude level is a moving average, which is repeatedly recalculated and repeatedly used to alter the relative amplitude of the audio signal and the detection thresholds. The apparatus uses a measure of the variability of the background amplitude to improve its speech detection. It generates start-of-speech and end-of-speech indications when the amplitude crosses respective thresholds for specified numbers of frames. The background amplitude level is calculated from frames which precede the start-of-speech indication by a predetermined amount and which follow the end-of-speech indication. The invention also provides a speech recognition system which compares the amplitudes an audio signal against the amplitudes of acoustic models of vocabulary words to determine which vocabulary words correspond to the signal. The system compensates for background noise by using the background amplitude level, described above, to alter the audio signal amplitudes relative to the acoustic model amplitudes.

15 Claims, 7 Drawing Sheets

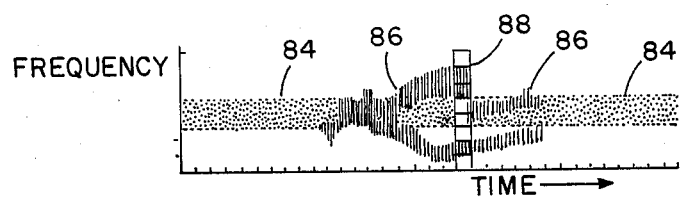
FIG. 2
PRIOR ART
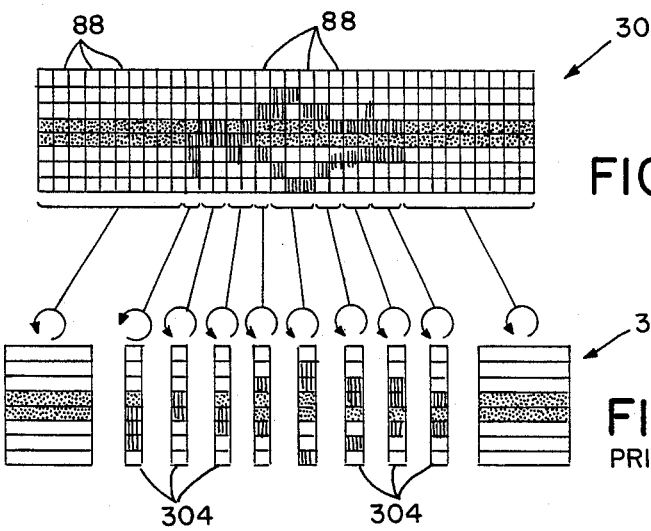
FIG. 3a
FIG. 3b
PRIOR ART
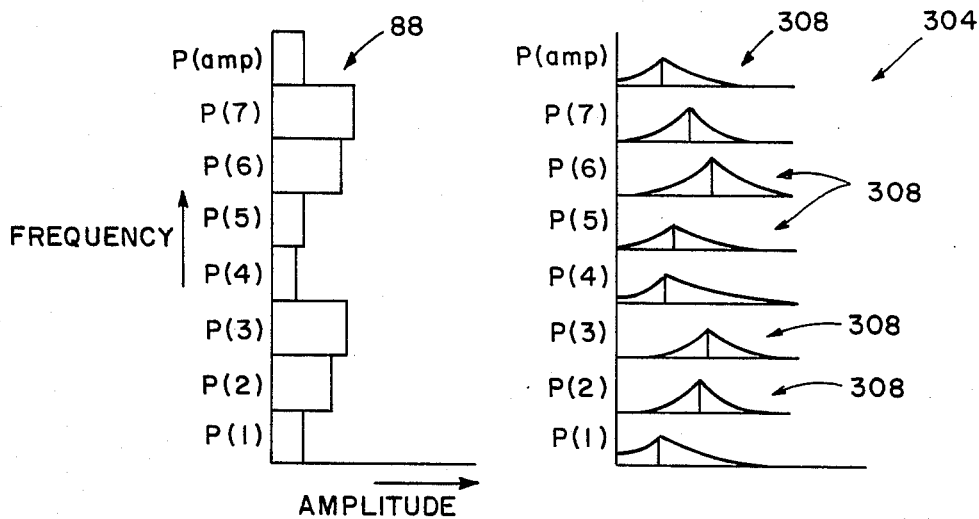
FIG. 4a
PRIOR ART
FIG. 4b
PRIOR ART

334

| INITIALIZE_VARIABLES | |
|---|---|
| -set currently_in_speech to NO | 336 |
| -set number_of_consecutive_nonspeech_frames to 0 | 338 |
| -RESET_SEARCH_WINDOWS | 340 |
| -set average_background_amplitude to the amplitude the current frame | 348 |
| -set background_amplitude_deviation to 0 | 350 |
| -set low_threshold to minimum_low_threshold | 352 |
| -set high_threshold to minimum_high_threshold | 354 |

| RESET_RESEARCH_WINDOWS | |
|---|---|
| -set both start_window_size and end_window_size to 0 | 344 |
| -set both number_of_frames_above_high_threshold and number_of_frames_below_low_threshold to 0 | 346 |

HANDLE_FRAME

- if currently_in_speech, reset number_of_consecutive_nonspeech_frames to 0    360
- else    362
  - increment number_of_consecutive_nonspeech_frames    364
  - if number_of_consecutive_nonspeech_frames > 16,    366
    - CALCULATE_BACKGROUND_LEVEL_AND_DEVIATION    368
    - ADJUST_THRESHOLDS_FOR_DEVIATION    370

- NORMALIZE_CURRENT_FRAME    382
- CALCULATE_NUMBER_OF_FRAMES_ABOVE_HIGH_THRESHOLD    392
- CALCULATE_NUMBER_OF_FRAMES_BELOW_LOW_THRESHOLD    400

- if not currently_in_speech,    410
  - if number_of_frames_above_high_threshold >= frames_required_for_speech_start,    412
    - mark current frame as trigger frame    418
    - point the token read pointer sixteen frames before the current frame    420
    - RESET_SEARCH_WINDOWS    422
    - set currently_in_speech to YES    425
  - return    444

- else    416
  - if number_of_frames_above_high_threshold >= frames_required_for_speech_start,    426
    - RESET_SEARCH_WINDOWS    428
    - return    430
  - else if number_of_frames_below_low_threshold >= frames_required_for_speech_end,    431
    - set the token read pointer to NULL, marking the current frame as end of token    432
    - set currently_in_speech to NO    434
    - RESET_SEARCH_WINDOW    436

FIG. 8

| CALCULATE_BACKGROUND_LEVEL_AND_DEVIATION |
|---|
| -set average_background_amplitude to a*(original_amplitude of the frame sixteen frames before the current frame) + b*(average_background_amplitude)  372 |
| -set background_amplitude_deviation to a*(absolute value of the original_amplitude of the frame sixteen frames before the current frame minus average_background_amplitude) + b*(background_amplitude_deviation)  374 |

FIG. 9

| ADJUST_THRESHOLDS_FOR_DEVIATION  376 |
|---|
| -set low_threshold to minimum_low_threshold + 2*(background_amplitude_deviation)  378 |
| -set high_threshold to the maximum of (minimum_high_threshold) or (low_threshold + minimum_separation)  380 |

FIG. 10

| NORMALIZE_CURRENT_FRAME  386      384 |
|---|
| -save the amplitude of the current frame as original_amplitude |
| -set the amplitude of the current frame to the amplitude of that frame minus average_background_amplitude + amplitude_offset  388 |

FIG. 11

| CALCULATE_NUMBER_OF_FRAMES_ABOVE_HIGH_THRESHOLD |
|---|
| -if start_window_size => maximum_start_window_size and if the amplitude of the frame maximum_start_window_size frames before the current frame is greater than high_threshold, decrement the number_of_frames_above_high_threshold  394 |
| -if the amplitude of the current frame > high_threshold, increment number_of_frames_above_high_threshold  396 |
| -if start_window_size < maximum_start_window_size, increment start_window_size  398 |

FIG. 12

| CALCULATE_NUMBER_OF_FRAMES_BELOW_LOW_THRESHOLD |
|---|
| -if end_window_size => maximum_end_window_size and if the amplitude of the frame maximum_end_window_size frames before the current frame is less than low_threshold, decrement number_of_frames_below_low_threshold  404 |
| -if the amplitude of the current frame < low_threshold, increment_number_of_frames_below_low_threshold  406 |
| -if end_window_size < maximum_end_window_size, increment end_window_size  408 |

FIG. 13

SPEECH DETECTION AND RECOGNITION APPARATUS FOR USE WITH BACKGROUND NOISE OF VARYING LEVELS

FIELD OF THE INVENTION

The present invention relates to speech detection and recognition apparatus in general, and in particular to such apparatus designed for use with varying levels of background noise.

BACKGROUND OF THE INVENTION

There has long been a desire to have machines capable of responding to human speech, such as machines capable of obeying human commands and machines capable of transcribing human dictation. Such machines would greatly increase the speed and ease with which people communicate with computers and the speed and ease with which they record and organize their words and thoughts.

Due to recent advances in computer technology and speech recognition algorithms, speech recognition machines have begun to appear in the past several decades, and have become increasingly more powerful and less expensive. For example, the assignee of the present application has publicly demonstrated speech recognition software which runs on popular personal computers and which requires little extra hardware. This system is capable of providing speaker-dependent, discrete word recognition for vocabularies of up to two thousand words at any one time, and many of its features are described in U.S. patent application Ser. No. 797,249. This prior application (hereinafter referred to as application Ser. No. 797,249) which is entitled "Speech Recognition Apparatus and Method", is assigned to the assignee of the present application, and is incorporated herein by reference.

One of the problems encountered in most speech recognition systems is that of varying levels of background noise. Many speed recognition systems determine which portion of an audio signal contains speech to be recognized by using speech detection apparatus, such as the speech detection apparatus described in the above mentioned application Ser. No. 797,249. Many such speech detecting apparatuses compare the amplitude of an audio signal with amplitude thresholds to detect the start or end of an utterance to be recognized. Such methods work well when there is little background sound, or where the background sound is relatively constant in amplitude. But if the amplitude of the background sound either goes up or down relative to the level for which the start of utterance and end of utterance thresholds are set, the system is likely to make mistakes in detecting the beginning and end of utterances.

Changes in background sound also tend to decrease the reliability of speech recognition itself. Many speech recognition systems, such as that described in application Ser. No. 797,249, recognize words by comparing them to acoustic models of vocabulary words or of parts of vocabulary words. Such acoustic models usually contain information about the amplitude of the sounds they represent. Since background sounds are added to speech sounds which are spoken over them, changes in the background sound change the amplitudes of sounds head by the recognizer during speech, and thus can decrease the accuracy with which the recognizer matches speech sounds against the amplitude descriptions contained in their acoustic models.

SUMMARY OF THE INVENTION

It is an object of the present invention to provide speech detection apparatuses which provide improved accuracy at detecting the beginning and end of speech in the presence of background sound of varying amplitude.

It is a further object of the present invention to provide speech detection apparatuses which provide such improved accuracy automatically in response to changing background amplitude.

It is another object of the present invention to provide speech recognition apparatuses which provides improved accuracy at recognizing speech in the presence of background sound of varying amplitude.

It is yet another object of the present invention to provide such speech recognition apparatuses which provide improved accuracy automatically in response to changing background amplitude.

Speaking broadly, the present invention provides speech detection and recognition apparatus which derives a background amplitude level from portions of an audio signal that do not contain speech, and uses that background amplitude level to, in effect, adjust the amplitude thresholds used to detect the presence or absence of speech. It also uses that background amplitude level to compensate the comparisons which are made by a speech recognition means between the amplitudes of the audio signal and the acoustic models for such changes in the background amplitude level.

According to one aspect of the present invention, apparatus is provided for detecting whether a portion of an audio signal contains speech to be recognized. The apparatus has a speech detection means for comparing the amplitude of the audio signal during successive time periods with one or more amplitude thresholds, and for generating, in response to those comparisons an indication of whether or not a given portion of the audio signal contains speech to be recognized. The apparatus derives a background amplitude level from the amplitude of the audio signal during times when the signal does not contain speech to be recognized. It alters magnitude of the audio signal amplitudes relative to the speech detection thresholds as a function of this background amplitude level, so as to improve the operation of the speech detection means.

Preferably, the background amplitude level is derived from the audio signal during periods which the speech detection means indicates do not contain speech to be recognized. It is preferred that the apparatus repeatedly recalculate the background amplitude level and repeatedly alter the relative magnitudes of the audio signal amplitudes and the speech detection thresholds as a result. The background amplitude level can be calculated as a weighted average. And the apparatus can derive a measurement of the variability of the background amplitude and use that measurement in detecting the end of speech.

Preferably, the apparatus generates a speech status indication when the amplitude of the audio signal is on a certain side of a threshold amplitude for a given number of time periods during a given length of time. This can include means for generating a start-of-speech indication when the amplitude exceeds a speech threshold, and means for generating an end-of-speech indication when the amplitude is below a no-speech threshold. It is also preferred that the background amplitude level only be calculated from time periods which precede each start-of-speech indication by a predetermined amount and which come after the following end-of-speech indication.

According to another aspect of the invention, a speech recognition system is provided which receives a representation of an audio signal, including amplitude measurements of its successive parts. The system stores acoustic models, which include amplitude descriptions, and stores associations between those models and vocabulary words. The system contains recognition means for comparing a representation of the audio signal against the acoustic models, and for determining which one or more vocabulary words most probably correspond to that representation. This comparison, is based, at least in part, on the comparison of the amplitude measurements of the signal representation against the amplitude descriptions of the acoustic models. The system further derives a background amplitude description from amplitude measurements taken from a portion of the signal which does not contain speech to be recognized. The system alters the magnitude of the amplitude measurements from the signal relative to that of the amplitude descriptions from the acoustic models as a function of the background amplitude description.

Preferably, the speech recognition system includes speech detection means for indicating whether or not a given portion of the signal contains speech to be recognized, and means for responding to that indication in determining from which portion of the signal to take the amplitude measurements used to derive the background amplitude description. It is preferred that the speech detection means compares the amplitude measurements from the signal against one or more amplitude thresholds and that the system alters the magnitude of the amplitude measurements from the signal relative to the speech detection amplitude thresholds.

DESCRIPTION OF THE DRAWINGS

These and other aspects of the present invention will become more evident upon reading the following description of the preferred embodiment in conjunction with the accompanying drawings, in which:

FIG. 2 is a schematic representation of the spectrogram of an audio signal, showing the sound in one time period being converted into an eight-parameter spectral frame;

FIG. 3A is a schematic illustration of an audio signal represented as a sequence of eight-parameter spectral frames, FIG. 3B is a schematic illustration of a vocabulary word represented by a sequence of acoustic models, and together the two figures provide an abstract representation the dynamic programming algorithm of the type shown in FIG. 1;

FIG. 4A is a schematic representation of the eight spectral parameters of a frame of the type shown in FIG. 3A, and FIG. 4B is a schematic representation of the eight dimensional probabilty distribution associated with each node in the vocabulary word model shown in FIG. 3B;

FIG. 6 is a block diagram of the functional steps performed in a subroutine which initializes variables used in the subroutine of FIG. 8;

FIG. 7 is a block diagram of the functional steps performed by a subroutine RESET-SEARCH-WINDOW, which is called by the subroutines of FIGS. 6 and 8;

FIG. 8 is a block diagram of the functional steps contained in a subroutine called HANDLE-FRAME, which is called by a subroutine shown in FIG. 5;

FIGS. 9 through 13 are subroutines called by the HANDLE-FRAME subroutine of FIG. 8;

FIG. 15A is a schematic representation of the amplitude levels produced by uttering the same word as in FIG. 14A in the presence of a relatively noisy background level, and FIG. 15B is a schematic representation of the same amplitudes after they have been normalized for the background amplitude level detected in FIG. 15A.

DETAILED DESCRIPTION OF A PREFERRED EMBODIMENT

Figure 1:
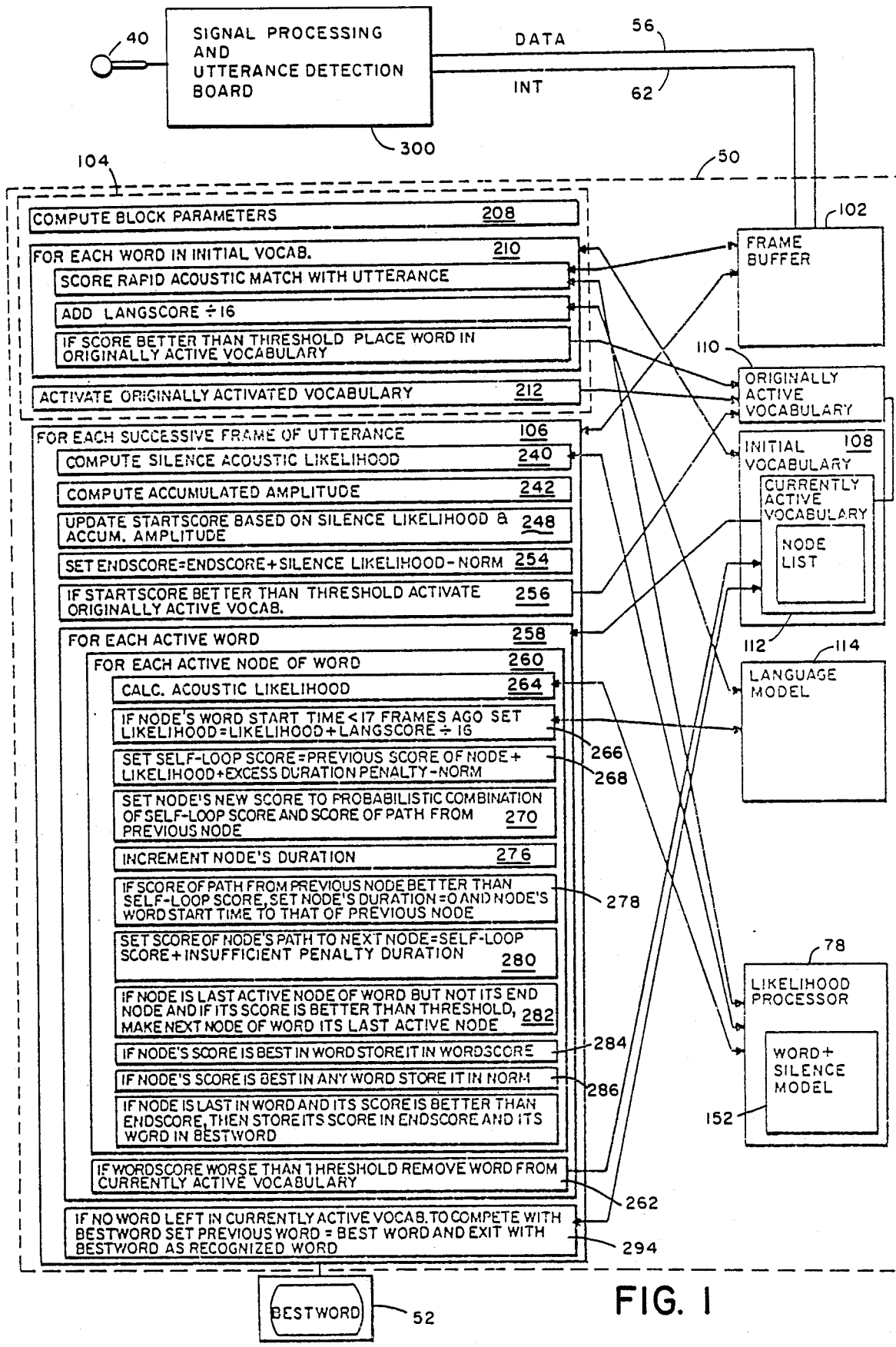
FIG. 1 is a schematic block diagram of a speech recognition system according to the present invention, outlining the functional steps used in the actual recognition process.

Referring now to FIG. 1, a speech recognition system embodying the present invention is represented. This figure is identical to FIG. 8 contained in the above mentioned application Ser. No. 797,249, except that it has replaced the A/D converter 42, the FFT circuit 46, the peak amplitude detector, and utterance detector shown in FIG. 8 of that former application. FIG. 1 has replaced them with a signal processing and utterance detection board 300. The relatively brief and somewhat simplified description of the recognition process of FIG. 1 which follows is provided to highlight the aspects of that process which are most relevant to the present invention. For a much more detailed explanation of the process of FIG. 1, the reader shoulder refer to the above mentioned application Ser. No. 797,249, which is incorporated herein by reference.

Briefly stated, the process of FIG. 1 receives an audio signal, such as the audio signal shown as a spectrogram in FIG. 2, which contains background noise 84 and speech sounds 86, from a microphone 40. It converts the signals into a digital representation comprises of spectral frames, as indicated in FIG. 3A, and compares that digital representation against an acoustic model, represented in FIG. 3B, associated with each of a plurality of vocabulary words.

The analog signal produced by microphone 40 is digitized by an A/D converter and then converted by a fast fourier transform (FFT), or other fourier transform, such as a discrete fourier transform, into a sequence 302 of spectral frames 88, as is illustrated in FIG. 3A. The FFT calculates the energy amplitude of the audio signal at each of eight frequency bands every fiftieth of a second. The logarithm of each of these eight spectral amplitudes is calculated. Then the average of these eight logarithms is determined and used as the parameter P(amp) shown in FIG. 4A. The value of this average is subtracted from the other seven spectral logarithms, so as to effectively normalize them relative to the amplitude of P(amp), producing the severn spectral amplitude parameters P(1)–P(7) shown in FIG. 4A. The resulting eight spectral parameters, and, in particular, the frame's overall amplitude parameter, P(amp), are often referred herein simply as "amplitudes", since, in this application, that word is meant to include measures of amplitude, such as the logarithmic measures just described.

After a portion of an audio signal has been converted into a sequence of frames 302, shown in FIG. 3A, it is stored in the frame buffer 102 shown in FIG. 1. Once this is done, a prefiltering step shown in the Box 104 of FIG. 1 compares a crude spectral model derived from the initial frames of the utterance to be recognized against crude spectral models of the beginning of each word in the system's vocabulary. This determines which vocabulary words appear enough like the data in frame buffer 102 to warrant further comparison against that data.

One prefiltering is complete, step 106 uses themore computationally expensive process of dynamic programming to compare the frames of the utterance to be recognized against an acoustic model 306 of each surviving vocabulary word. Each of these word models 306 is comprised of a sequence of node models 304, as is indicated in FIG. 3B. As can be seen in FIG. 4B, each of these node models 304 contains an eight dimensional probability distribution, each dimension of which corresponds to a parameter in the frames 88. Each dimension 308 of a node's probability distribution represents the likelihood of the corresponding frame parameter having various amplitudes if its frame corresponds to the part of the word represented by that node model. This probability distribution can be considered an amplitude description, because is describes the probable amplitudes of each of the eight parameters of a frame corresponding to the part of the word it represents.

The amplitude of each of a frame's parameters is compared against its corresponding dimension of a node's probability distribution to determine the likelihood of that amplitude being generated if the frame corresponds to the sound represented by the node model. All these likelihoods for a given frame are combined to calculate a score representing the likelihood of that frame corresponding to the node model. Step 106 uses the likelihood scores for individual frames against individual nodes to find the optimal time alignment between the frames of an utterance and the nodes of a word model, as is indicated schematically in FIGS. 3A and 3B. The likelihood scores for each frame against the node with which it is time aligned are combined to create a score for the entire word. This is done for each active word in the vocabulary, until the best scoring word is selected as an output, as is shown at 52 at the bottom of FIG. 1.

Figure 5:
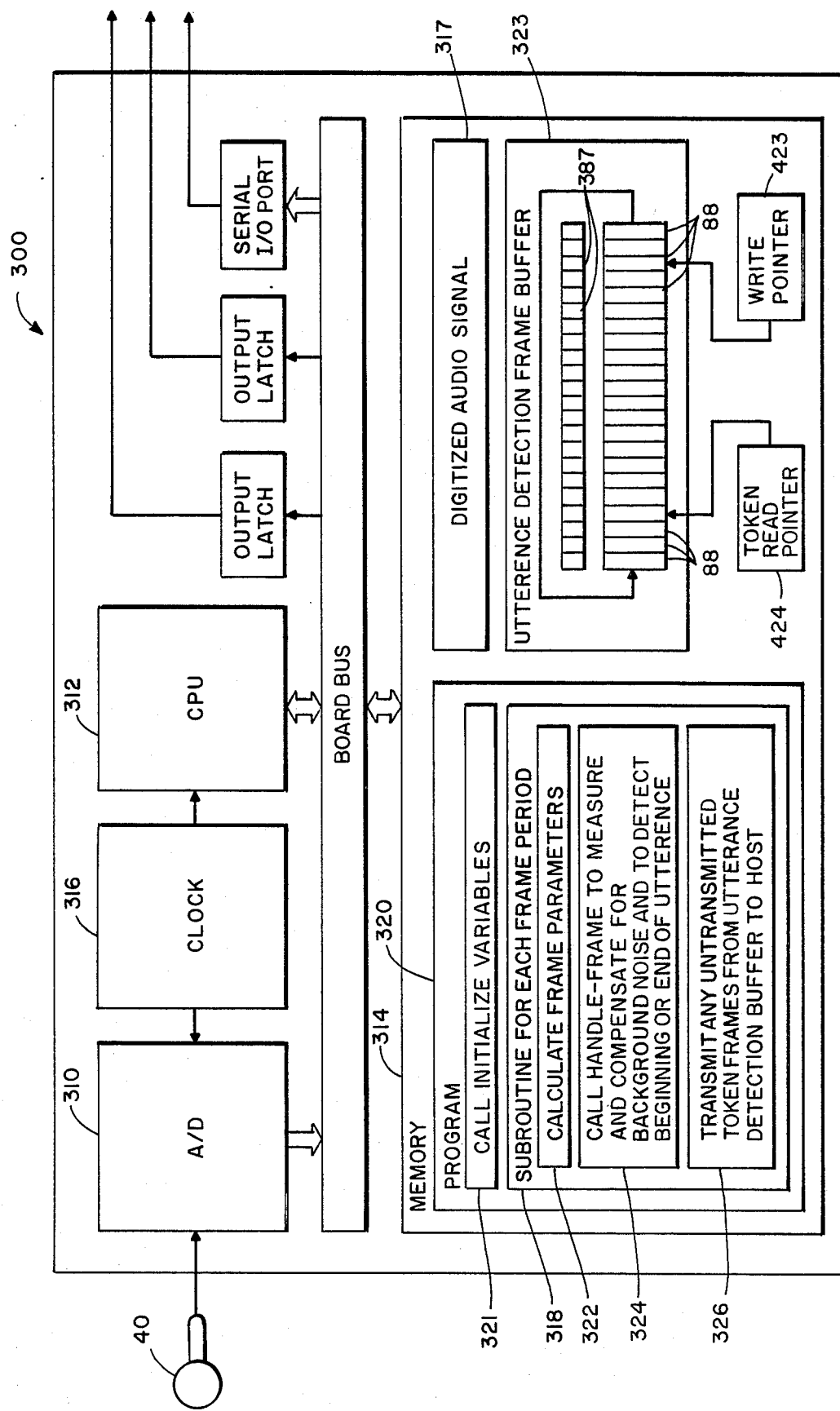
FIG. 5 is a schematic representation of the signal processing and utterance detection board shown in FIG. 1, illustrating its relevant hardware, programming, and data structure components.

Referring now to FIG. 5, the signal processing and utterance detection board 300, referred to above the regard to FIG. 1, is designed as an add-on card to be inserted into a standard personal computer, such as an IBM PC AT computer. However, it should be understood that many of the functions performed by this board could be performed in the CPU and memory of a host computer, and thus do not need to be located on a separate board, as is described in the preferred embodiment.

The board 300 contains an A to D converter 310 which converts the analog signal from the microphone 40 into a digital representation. The resulting digital signal is read by a CPU 312 and stored in memory 314 in a location indicated by the numeral 317. The memory 314 contains a program portion 320 which contains the programming which controls the operation of the CPU 312. When the board 300 is first turned on, this programming causes it to execute and instruction 321, contained within the program memory 320. This instruction calls a subroutine INITIALIZE-VARIABLES, described below with regard to FIG. 6 which initializes the variables used by the board's CPU. Then, once the board is up and running, a clock 316 causes the CPU 312 to perform a subroutine 318, stored in the board's program memory, once every frame period, that is, once every fiftieth of a second. The subroutine 318 includes a step 322 which calculates the eight spectral frame parameters required to produce a frame for the current frame period. This step takes the digital representation of the analog signal 317 produced by the A to D converter 310, uses a fast Fourier transform to convert it into a frame of eight spectral parameters of the type described above with regard to FIG. 4A, and stores that frame in the utterance detection frame buffer 323 at the location pointed to by write pointer 423.

When step 322 is complete, the subroutine 318 executes step 324. This step calls a subroutine HANDLE-FRAME. This subroutine measures and compensates for the amplitude of background noise and detects the beginning and end of utterances, as is described below with regard to FIG. 8. Once step 324 is complete, step 326 transmits any previously un-transmitted frames considered to contain speed to be recognized to the buffer 102 of the host computer which runs the process shown in FIG. 1, so that the process of FIG. 1 can be run upon those frames.

Referring now to FIG. 6, as is stated above, when the board 300 is first turned on its calls a subroutine, INITIALIZE-VARIABLES. This subroutine initializes the variables used by the board's CPU. FIG. 6 illustrates the steps of this subroutine which are relevant to the present invention. Step 336 of the subroutine sets of variable currently-in-speech to NO. This variable is used to indicate whether or not board 300 thinks the current frame contains speech to be recognized. Then step 338 sets a variable number-of-consecutive-non-speech-frames to 0. This variable is used to keep count of the number of consecutive frames which are considered not to contain speech to be recognized.

Next, step 340 calls a subroutine RESET-SEARCH-WINDOWS. As is shown in FIG. 7, this subroutine performs a step 344, which sets both the variables start-window-size and end-window-size to 0. These variables are used to detect the beginning and end of speech. As is described below the subroutine HANDLE-FRAME detects the beginning of speech when the number of frames within a "start window" of recent frames exceed a certain number, and detects the end of speech when the number of frames below a certain threshold within an "end window" of recent frames exceeds another number. The size of the start window can vary between 0 and an upper limit, called maximum-start-window-size, which preferably has a value of 5. The end window size may vary between 0 and an upper limit of maximum-end-window-size, which is preferably 20. After step 344 sets the initial size of the start window and the end window to 1, step 346 of FIG. 7 sets the variables number-of-frames-above-high-threshold and number-of-frames-below-low threshold to 0. The first of these variables represents the number of frames in the start window which exceed the high-threshold used to detect the start of speech. The second represents the number of frames in the end window below the low-threshold used to detect the end of speech.

Once the call by step 340 to FIG. 6 to RESET-SEARCH-WINDOWS is complete, step 348 of that figure sets the variable average-background-amplitude to the amplitude of the current frame, as represented by the logarithmic value stored in the parameter P(amp) of the current frame 88. The average-background-amplitude is used to represent the average amplitude of the current background noise. Once this variable has been set, step 340 sets the variable background-amplitude-deviation to 0. This variable represents the amount of which the amplitude of the background noise varies from the average-background-amplitude. Then step 352 sets the variable low-threshold, which is the amplitude threshold used to detect the end of speech, to the minimum value of that threshold, minimum-low-threshold, and step 354 sets the variable high-threshold, which is the amplitude threshold used to detect the start of speech, to the minimum value of the threshold, minimum-high-threshold. In the preferred embodiment, the logarithmic amplitude values P(amp) range from zero to two hundred and fifty-five, with each unit in that range corresponding to approximately ⅜ of a decibel, and minimum-low-threshold is sixty and minimum-high-threshold is one hundred.

When the call to INITIALIZE-VARIABLES is finished and the board 300 has been properly initialized, its program calls the subroutine 318, shown in FIG. 5, once every fiftieth of a second. After calculating the eight frame parameters for the current frame period in step 322, subroutine 318 calls the subroutine HANDLE-FRAME shown in FIG. 8.

The first step of HANDLE-FRAME is step 360, which tests whether the variable current-in-speech is YES, indicating that the current frame contains speech to be recognized. If so, that step resets the variable number-of-consecutive-nonspeech-frames to 0, insuring that the count of consecutive non-speech frames does not begin until the system decides the current frame does not contain speech to be recognized. If, on the other hand, currently-in-speech is NO, indicating that the current frame is a non-speech frame, step 362 executes two substeps 364 and 366. Step 364 increments the number-of-consecutive-nonspeech-frames to keep count of consecutive non-speech frames. Step 366 tests to see if the number of such non-speech frames is greater than sixteen. If so, it executes steps 368 and 370.

Step 368 calls CALCULATE-BACKGROUND-LEVEL-AND-DEVIATION, shown in FIG. 9. This subroutine contains two steps 372 and 374. Step 372 updates the moving average stored in the variable average-background-amplitude. It does this by setting that variable equal to the sum of (1) a constant "a" times the original-amplitude, P(amp), of the frame sixteen frames before the current frame (b) a constant "b" times the former value of average-background-amplitude. Step 374 updates the moving average stored in the variable background-amplitude-deviation. It does this by setting that variable equal to the sum of (1) the constant "a" times the absolute value of the difference between the original-amplitude P(amp) of the frame sixteen frames before the current frame minus average-background-amplitude plus (b) the constant "b" times the former value of background-amplitude-deviation. The original-amplitude associated with each frame is the original amplitude, P(amp), described above with regard to FIG. 4A, calculated for a given frame by the step 322 described above.

In the moving average formulas used in steps 372 and 374, the constants "a" and "b" are chosen so that their sum equals 1. In the preferred embodiment "a" is 0.0078 and "b" is 0.9922. Taking fifty frames a second, these constant values give the moving average a "time constant" of 2.55 seconds. This means that it usually takes the system little more than two seconds to substantially adjust its average-background-amplitude to any new average-background-amplitude.

Both steps 372 and 374 update the value of their associated variables by using data taken from the original-amplitude, P(amp), of the frame sixteen frames before the current frame. This is done to avoid calculating the average-background-amplitude and background-amplitude-deviation frame frames which might be associated with speech to be recognized. As is described below, HANDLE-FRAME operates under the assumption that frames up to sixteen frames before the frame causing the system to detect the beginning of a speech may contain speech sounds. This is appropriate, since the amplitude of speech sounds rises relatively slowly at the start of many words.

Once the call by step 368 of FIG. 8 to CALCULATE-BACKGROUND-LEVEL-AND-DEVIATION is complete, step 370 calls ADJUST-THRESHOLDS-FOR-DEVIATION, shown in FIG. 10. This subroutine contains two steps, 378 and 380. Step 378 sets the low-threshold, used to detect the end of speech, to the sum of minimum-low-threshold plus two times the current background-amplitude-deviation calculated in step 374. Step 378 increases low-threshold in proportion to increases in background-amplitude-deviation because, as the randomness of the background amplitude increases, it becomes increasingly likely that the amplitudes of background noise will be above minimum-low-threshold, even after they have been normalized for the average-background-level, as is described below with regard to FIG. 11. Increasing low-threshold in response to increases in background-amplitude-deviation decreases the chance that such random background noise will prevent the system from detecting the end of an utterance.

After low-threshold is set, step 380 of FIG. 10 sets high-threshold, used for the detection of the start of utterances, to the maximum of either (a) minimum-high-threshold or (b) the sum of low-threshold, as just calculated, plus a constant minimum-separation. Minimum-separation represents the minimum allowable separation between the low-threshold and high-threshold. In the preferred embodiment this separation constant is set to 16. Step 380 causes high-threshold to remain equal to minimum-high-threshold unless increases in background-amplitude-deviation raise low-threshold to within the minimum-separation of high-threshold, in which case high-threshold moves to maintain the minimum-separation above low-threshold.

After the call by step 370 of FIG. 8 to ADJUST-THRESHOLDS-FOR-DEVIATION is complete, step 362 of that figure is finished and HANDLE FRAME advances to step 382, which calls NORMALIZE-CURRENT-FRAME. This subroutine, which is shown in FIG. 11, contains two steps 386 and 388. Step 386 saves the original value of the amplitude parameter, P(amp), of the current frame in the variable original-amplitude in a location 387 associated with each of the frames 88 in the utterance detection frame buffer 323 shown in FIG. 5. Then step 388 normalizes the amplitude parameter of the current frame to compensate for background noise. It does this by subtracting the variable average-background-amplitude from that amplitude and then adding a constant amplitude-offset to the difference. The amplitude-offset is added so that frames whose amplitudes are below the average-background-amplitude will not have their amplitude truncated by the subtraction from them of average-background-amplitude.

Figure 14A:
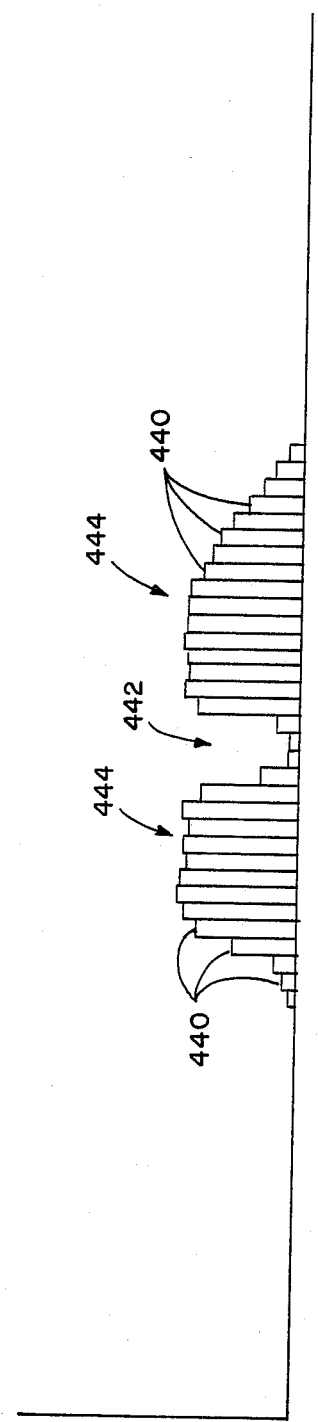
FIG. 14A is a schematic representation the amplitude of an utterance recorded in the virtual absence of background noise.
Figure 14B:
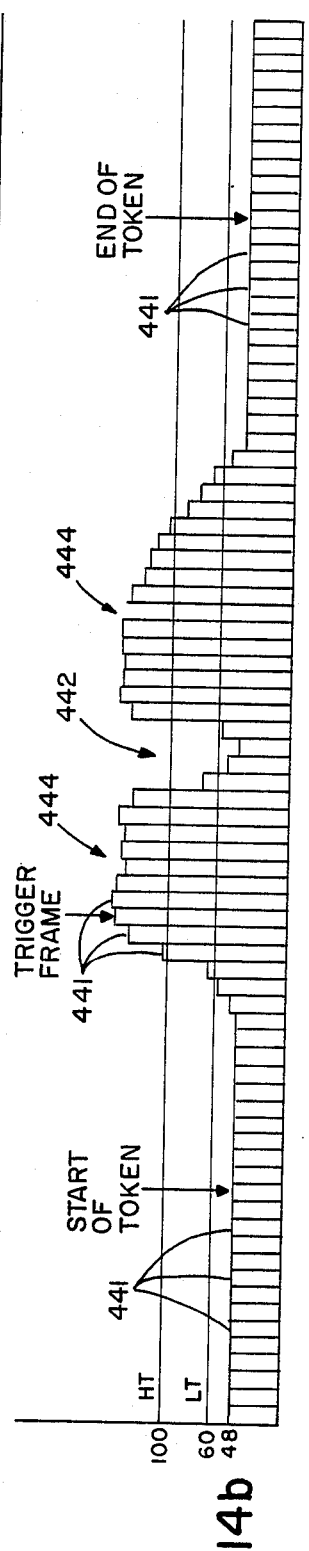
FIG. 14B is a schematic representation of the same amplitudes after they have been normalized for the very low background noise level shown in FIG. 14A.
Figure 14C:
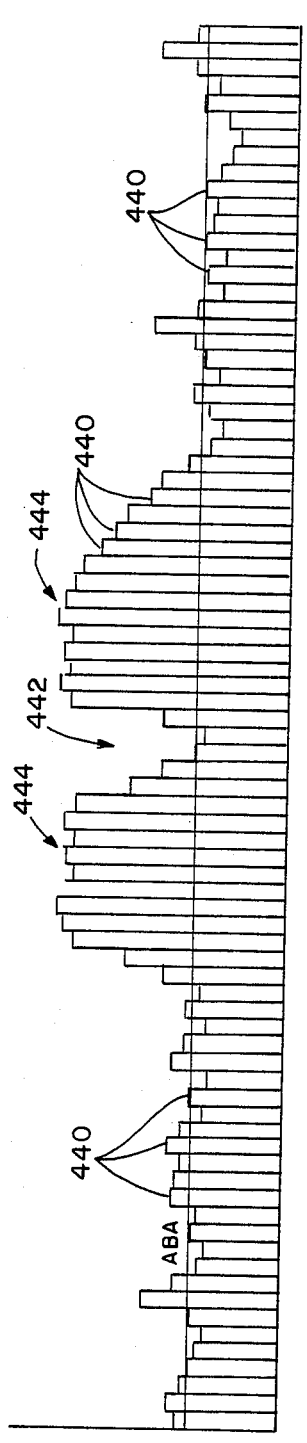
Figure 14D:
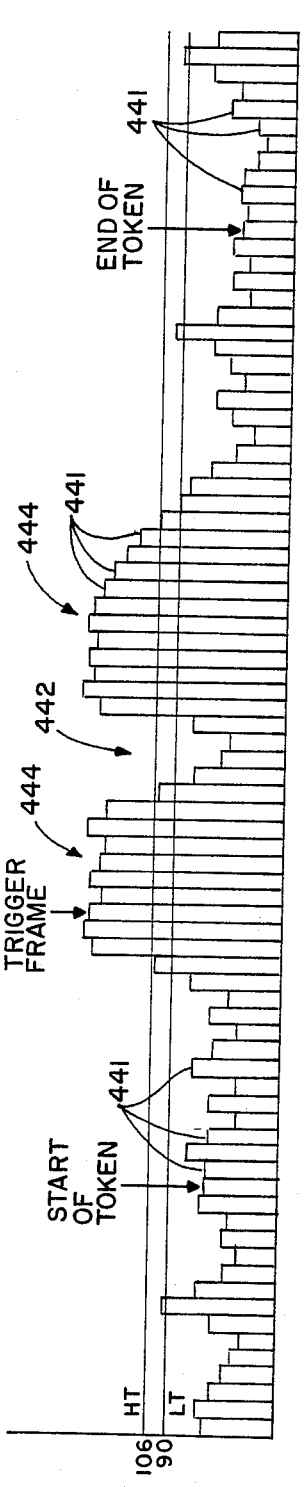

The result of the call to NORMALIZE-CURRENT-FRAME is indicated in FIGS. 14A, 14B, 15A and 15B. FIGS. 14A and 15A represent un-normalized amplitudes, and FIGS. 14B and 15B represent the corresponding amplitudes after normalization. FIG. 15A, for example, shows a sequence of un-normalized frame amplitudes produced when an utterance is spoken in a relatively noisy background. The average-background-amplitude is indicated approximately by the line marked with the initials ABA. The FIG. 15B shows the amplitudes of the same frames once they have been normalized and each of them has had the average-background-amplitude value subtracted from it and the value of the amplitude-offset added to it. This normalization tends to reduce the effect of background noise upon the comparisons between the frame amplitudes and the high and low thresholds indicated by the lines labeled HT and LT in 15B. It also tends to compensate for the effects of background noise on the comparison between the frames 88 and the acoustic node models 304 used in the recognition process described above in regard to FIG. 1, particularly if those acoustic models are derived from similarly normalized data.

Once the call by step 382 of FIG. 8 to NORMALIZE-CURRENT-FRAME IS complete, HANDLE-FRAME advances to step 392. This step calls CALCULATE-NUMBER-OF-FRAMES-ABOVE-HIGH-THRESHOLD, shown in FIG. 12. This subroutine contains three steps, 394, 396 and 398. Step 394 tests whether the start-window-size equals the maximum-start-window-size and, if so, also tests whether the normalized amplitude of the frame which occurs maximum-start-window-size frame before the current frame is greater than high-threshold. If both these conditions are met, it decrements the number-of-frames-above-high-threshold. This is done because the purpose of the start window is to limit the number of frames which contribute a count to the number-of-frames-above-high-threshold if their amplitudes is above that threshold. Step 394 ensures that the size of the start window does not exceed the maximum-start-window-size by subtracting one from the number-of-frames-above-high-threshold, if the start window is at its maximum size, and if the frame removed from that window by its advance to the current frame had previously contributed one to that number.

Once step 394 is complete, step 396 tests if the amplitude of the current frame is greater than high-threshold. If so, it increments the number-of-frames-above-high-threshold. Then step 398 tests whether start-window-size is less than the maximum-start-window-size. If so, it increments start-window-size.

Once the call by step 392 of FIG. 8 is complete, step 400 calls CALCULATE-NUMBER-OF-FRAMES-BELOW-LOW-THRESHOLD, shown in FIG. 13. This subroutine is virtually identical to the subroutine shown in FIG. 12, except that it updates the end window, instead of the start window, and updates the number-of-frames-below-low-threshold, rather than the number-of-frames-above-high-threshold.

In the preferred embodiment the maximum-start-window-size is 5 and the number of frames-required-for-speech-start is 3, whereas the maximum-end-window-size is 20 and the number of frames-required-for-speech-end is 15. The end window is longer than the start window for several reasons. First, to increase the chance that almost all frames containing speech to be recognized are sent to the hose computer, the detection board is made quick to detect the start of utterances and slow to detect their end. Second, the end window must be relatively long because it is not uncommon for the internal silences of words, such as those caused by phonemes such as "p", "b", "t", "d", "k", and "g", to last over ten frame periods. Third, the silences associated with the end of speech are more difficult to detect in the presence of background noise than the much louder sounds normally contained within speech to be recognized. A longer period is allowed for the detection of the end of speech, because such a longer sampling period is less likely to produce a mistaken result on account of the presence of random noise.

Once the call by step 400 of FIG. 8 is complete, step 410 tests if currently-in-speech is NO, indicating that the current frame does not contains speech to be recognized. If it is NO, steps 412 and 414 are executed. Step 412 tests whether the number-of-frames-above-high-threshold is greater than the number of frames-required-for-speech-start. If so, steps 418, 420 422, and 425 are executed. Step 418 marks the current frame as a trigger frame, which causes it to be treated as the utterance detection frame referred to in application Ser. No. 797,249. Then step 420 points the token start pointer 424 to the frame sixteen frames before the current frame. This is indicated in FIG. 5, in which the current frame is pointed to by the write pointer 423.

The word "Token" is used to refer to the sequence of frames considered by the board 300 to possibly contain speech to be recognized. As is described above, step 326 of FIG. 5 transmits all token frames to the frame buffer 102 of the host computer, so that the host can perform the recognition process of FIG. 1 upon that token. In each frame period, step 326 transmits all frames from the frame pointed to by the token read pointer up to, and including, the frame pointed to by the write pointer. Then step 326 advances the write pointer one frame, and, if the token read pointer has a non-NULL value, advances the token read pointer to the write pointer. Thus in the frame period when a speech start is detected, step 326 transmits the current frame and the sixteen frames which precede it to the host computer. Then during each successive frame period, until an end of speech is detected and the token read pointer is set to NULL, each successive frame of the token is sent to the host computer.

After step 420 sets the token read pointer, step 422 calls RESET-SEARCH-WINDOWS, described above. This subroutine resets to zero the start and end window sizes, as well as the counts of frames above the high-threshold and below the low-threshold. Once this subroutine call is complete, step 425 of FIG. 8 sets currently-in-speech to YES, indicating that the system has detected the start of speech and that all subsequent frames until an end of speech is detected are considered to contain speech to be recognized.

If the test at the start of step 410 finds currently-in-speech set to NO, step 414 causes HANDLE-FRAME to return to the subroutine 318 shown in FIG. 5, after step 412 is performed, whether or not step 412 detects the start of speech.

If the test at the top of step 410 finds currently-in-speech to be YES, the substeps of step 410 are skipped, and the substeps 426 and 431 of step 416 are executed instead. Step 426 tests if the number of frames above high threshold is greater than the nubmer of frames required for speech start. If so, steps 428 and 430 are executed. Step 428 calls RESET-SEARCH-WINDOWS, which resets window sizes and the counts of frames above high-threshold and below low-threshold. The purpose of step 426 is to reset the end window if number-of-frames-above-high-threshold indicates the current frame contains speech. This is done to reduce the chance that quiet parts of an utterance will cause the end of speech to be detected improperly early. For example, in the word "six", the "k"-like sound associated with the "x" tends to cause a brief silence, followed by an "s"-like sound. Without step 426, there is an increased chance that this silence will be counted toward an end-of-speech detection, even though it is followed by the "s" sound. Step 426 reduces this danger by resetting the end window, and thus preventing previous frames from contributing to an end-of-speech detection any time three frames within the last five are above the high-threshold.

After step 428 calls RESET-SEARCH-WINDOWS, step 430 causes HANDLE-FRAMES to return to the subroutine 318 shown in FIG. 5.

If, on the other hand, the test at the top of step 426 finds that the number of frames above the high threshold is not greater than the number of frames required for a speech start, step 431 is executed. This step tests if the number of frames below the low threshold is greater than the number required for a speech end detection. If so, it executes steps 432, 434 and 436. Step 432 sets the token read pointer 424 to NULL, indicating that the current frame marks the end of the token. As a result step 326 of FIG. 5 will not send the current frame, nor any frames which follow it until the next speech detection sets the token read pointer, to the host computer. Step 434 sets currently-in-speech to NO, to indicated that the end of speech has been detected, and step 436 calls RESET-SEARCH-WINDOWS to reset the start and end windows.

Once these steps are complete, step 416 and the subroutine HANDLE-FRAME are complete, and the program returns to subroutine 318, shown in FIG. 5. This causes step 326 to transmit any un-transmitted token frames to the host computer.

Referring now to FIGS. 14A, 14B, 15A, and 15B, a simplified graphic representation is given of the operation of the present system. FIG. 14A represents the original-amplitude values 440 associated with each of a sequence of frames produced when a word is spoken against a virtually silent background. The original-amplitudes 440 are the original, un-normalized, logarithmic amplitude values which are calculated for the parameter P(amp) in the step 322 of FIG. 5. It is assumed for purposes of example that the amplitude produced by speaking the word shown in FIGS. 14A, 14B, 15A, and 15B has a relatively silent portion 442, between the two louder portions, 444 and 446.

FIG. 14B shows the amplitudes of the frames shown in FIG. 14A after they have been normalized in step 388 of FIG. 11 by having the average-background-amplitude during their respective frame times subtracted from them and after having the constant amplitude-offset added to them. Since there is virtually no background sound in the example of FIG. 14A, this normalization has little effect other than that of adding the constant amplitude-offset to the amplitudes shown in FIG. 14A. FIG. 14B shows the low-threshold, labeled LT, and the high-threshold, labeled HT. Since the background-amplitude-deviation is virtually 0 in FIG. 14A, step 378 of FIG. 10 sets the low-threshold very close to the minimum-low-threshold of sixty. The minimum-high-threshold of one hundred is more than sixteen above this low-threshold, and thus step 380 of FIG. 10 sets high-threshold to minimum-high-threshold.

In the example of FIG. 14B, HANDLE-FRAME detects the beginning of speech at the third frame above high-threshold, indicated by the arrow labeled "trigger frame." This causes the frame sixteen frames before the trigger frame to be labeled as the start of token. The end of speech is detected 15 frames after the amplitude drops below low-threshold, as is indicated by the frame labeled "end of token."

FIG. 15A shows the un-normalized, original-amplitudes for a sequence of frames produced when the word of FIGS. 14A and 14B is spoken in the presence of a much greater amount of background noise. In the example of that figure, the high amplitude portions 444 and 446 and the low amplitude portion 443 of the word can be still be seen above the noise. But all the amplitudes have been shifted considerably higher than in FIG. 14A. In FIG. 15A the average-background-amplitude is indicated approximately by the line labeled ABA. In actuality, this variable is not constant, but varies according to the formula provided in step 372 of FIG. 9.

FIG. 15B illustrates what the amplitudes of FIG. 15A look like after they have been normalized by step 388. It also shows those normalized amplitudes relative to the low-threshold, LT, and the high-threshold, HT. These thresholds are indicated approximately by straight lines, although in actuality they vary in response to variations in background-amplitude-deviation according to the formulas set forth in FIG. 10.

As can be seen by comparing FIGS. 14B and 15B, the normalization of amplitudes removes much of the shift in amplitude which results from changes in background noise. Furthermore, it can be seen that raising the low-threshold as a function of the increases in the background-amplitude-deviation has the effect of making the end of speech detection less subject to random noise. As these figures indicates, the present invention makes the detection of the start and end of speech more independent of the effects of changes in background noise levels. One reason why the present invention works so well is that human speakers, when speaking in the presence of noise, tend to increase the amplitude of their speech to compensate for the background sound. This is why the speech signal of FIG. 15A tends to stick almost as high above its relatively noisy background as does the speech signal of FIG. 14A above its relatively silent background, even though the amplitude values shown actually represent logarithms of amplitude.

It can be seen that a new improved apparatus for detecting and recognizing speech in the presence of varying levels of background noise has been described. Experiments indicate that such an apparatus greatly improves the reliability with which the beginning and ends of utterances can be detected in the presence of widely varying levels of background noise, and that, furthermore, it improves the accuracy of recognition in the presence of such varying background noise levels.

In the description above, the only amplitude measurement normalized for background noise is the parameter P(amp), described above with regard to FIG. 4A. But since, as is described above with regard to FIG. 1, all of the other seven amplitude parameters of each frame are normalized relative to the frame's amplitude parameter, P(amp), this process in effect normalizes all eight of each frame's parameters. It should be understood, however, that in other embodiments of the invention similar normalization techniques could be used to compensate all amplitude parameters of a frame for background amplitude levels calculated for those parameters. It should also be understood that the present invention can be used with systems which use representations of audio signals other than the eight-parameter spectral representation described above. Furthermore it should be understood that the present invention can be used with speech recognition algorithms other than that described in FIG. 1 and described in even greater detail in application Ser. No. 797,249.

Accordingly, the present invention should not be considered to be limited by the description herein of the preferred embodiment, but rather should be interpreted in accordance with the following claims.

What I claim is:

1. Apparatus for detecting whether a portion of an audio signal generated over successive time periods contains speech to be recognized, said apparatus comprising:
    speech detection means for comparing the amplitude of the audio signal during successive time periods with one or more amplitude thresholds, and for generating, in response to said comparisons, an indication of whether or not a given portion of said audio signal contains speech to be recognized;
    means for deriving a background amplitude level from the amplitude of said audio signal for one or more time periods in which the signal does not contain speech to be recognized, which level indicates the amplitude of the audio signal when it does not represent speech to be recognized;
    means for deriving a measure of the spread of the distribution of the background amplitude level; and
    means for altering, for purposes of the comparisons of the speech detection means, the relative magnitude of the audio signal amplitudes and the amplitude thresholds as a function of the background amplitude level and spread.

2. Apparatus as described in claim 1 wherein said means for deriving a background amplitude level includes means, responsive to said speech detection means, for deriving said background amplitude level from the amplitudes of said audio signal for one or more periods of time which the speech detection means indicates do not contain speech to be recognized.

3. Apparatus as described in claim 2 in which:
    said means for deriving a background amplitude level includes means for repeatedly recalculating said background amplitude level in response to changes in the amplitude of the audio signal for time periods which the speech detection means indicates do not contain speech to be recognized; and
    said means for altering includes means for repeatedly altering the magnitude of said audio signal amplitudes relative to said amplitude thresholds in response to changes in said background amplitude level.

4. Apparatus as described in claim 2 wherein said means for deriving a background amplitude level includes means for calculating that level as an average of said amplitudes during periods of time indicated by said speech detection means as not corresponding to speech.

5. Apparatus as described in claim 4 wherein said means for calculating the background amplitude level includes means for calculating that level as a weighted average of such amplitudes.

6. Apparatus as described in claim 1 wherein:
    said speech detection means includes means for indicating an end of speech in the audio signal when a portion of that signal has audio signal amplitudes for one or more time periods below an end-of-speech threshold;
    said speech detection means includes means for raising and decreasing said end-of-speech threshold relative to said amplitude measurements in correspondence to rises and decreases in said measurement of spread of the background amplitude level.

7. Apparatus as described in claim 1 wherein said speech detection means includes means for generating a start-of-speech indication for a portion of the signal in which audio signal amplitudes for a plurality of time periods exceed a certain threshold amplitude.

8. Apparatus as described in claim 1 wherein said speech detection means include means for generating an end-of-speech indication for a portion of the signal in which audio signal amplitudes for a plurality of time periods are below a certain threshold amplitude.

9. Apparatus as described in claim 1 wherein said speech detection means includes:
    means for generating a start-of-speech indication for a portion of the signal in which audio signal amplitudes for a plurality of time periods exceed a speech threshold amplitude; and
    means for generating an end-of-speech indication for a second portion of the signal in which audio signal amplitudes for a plurality of time periods are below a no-speech threshold amplitude.

10. Apparatus as described in claim 9 wherein:
    said means for generating a start-of-speech indication includes means for generating that indication when a portion of the signal having a first maximum duration has amplitudes which exceed said speech threshold amplitude during a first number of time periods; and
    said means for generating an end-of-speech indication includes means for generating that indication when a portion of the signal having a second maximum duration, which is longer than the first maximum duration, has amplitudes which exceed said speech threshold amplitude during a second number of time periods, which is greater than said first number of time periods.

11. Apparatus as described in claim 9 wherein said means for deriving a background amplitude level includes selecting means for causing it to derive said level only from audio signal amplitudes for time periods which do not occur between a start-of-speech indication and its following end-of-speech indication generated by said means for generating.

12. Apparatus as described in claim 11 wherein said selecting means includes means for causing the means for deriving a background level not to derive said level from audio signal amplitudes for time periods which occur within a certain time period before a time period associated with a start-of-speech indication.

13. A speech recognition system comprising:
   means for receiving a representation of an audio signal, including amplitude measurements of successive parts of said signal; means for strong acoustic models, including amplitude descriptions, associated with the sounds of vocabulary words;
   recognition means for comparing the representation of a portion of the audio signal against the acoustic models, and for determining, as a result of those comparisons, which one or more vocabulary words most probably correspond to that representation, the comparison being based, at least in part, on the comparison of the amplitude measurements of the signal representation against the amplitude descriptions of the acoustic models;
   means for deriving a background amplitude description from one or more amplitude measurements taken from a portion of the signal representation which does not contain speech to be recognized, which description provides a model of said one or more amplitude measurements; and
   normalization means for altering the magnitude of the amplitude measurements from the signal representation relative to the magnitude of the amplitude descriptions from the acoustic models as a function of the background amplitude description.

14. A speech recognition system as described in claim 13 wherein:
   said system further includes speech detection means for generating an indication of whether or not a given portion of the signal representation contains speech to be recognized; and
   said means for producing a background amplitude description includes means for responding to the indication of whether or not the signal representation contains speech to be recognized in determining from which portions of the signal representation to take amplitude measurements used to derive said background amplitude description.

15. A speech recognition system as described in claim 14 wherein:
   said speech detection means includes means for comparing the amplitude measurements of the signal representation against one or more amplitude thresholds and for generating said indication of whether or not a given portion of the signal representation contains speech to be recognized in response to such comparisons; and
   said normalization means includes means for altering the magnitude of the amplitude measurements from the signal representation relative to the magnitude of the one or more amplitude thresholds used by said speech detecting means as a function of the background amplitude description.

* * * * *